United States Patent [19]

Levy et al.

[11] Patent Number: 5,600,831
[45] Date of Patent: Feb. 4, 1997

[54] APPARATUS AND METHODS FOR RETRIEVING INFORMATION BY MODIFYING QUERY PLAN BASED ON DESCRIPTION OF INFORMATION SOURCES

[75] Inventors: Alon Y. Levy; Divesh Srivastava, both of New Providence, N.J.

[73] Assignee: Lucent Technologies Inc., Murray Hill, N.J.

[21] Appl. No.: 347,016

[22] Filed: Nov. 30, 1994

Related U.S. Application Data

[63] Continuation-in-part of Ser. No. 203,082, Feb. 28, 1994.

[51] Int. Cl.$^6$ .................. G06F 17/30; G06F 7/00
[52] U.S. Cl. ............... 395/602; 364/280.5; 364/282.1; 364/DIG. 1; 395/54
[58] Field of Search ................... 395/600, 575, 395/425

[56] References Cited

U.S. PATENT DOCUMENTS

| | | | |
|---|---|---|---|
| 4,408,302 | 10/1983 | Fessel et al. ........................... | 364/900 |
| 4,769,772 | 9/1988 | Dwyer .................................. | 395/600 |
| 4,933,800 | 6/1990 | Borgendale et al. .................. | 364/523 |
| 5,021,989 | 6/1991 | Fujisawa et al. ..................... | 364/900 |
| 5,091,852 | 2/1992 | Tsuchida et al. ..................... | 395/600 |
| 5,117,349 | 5/1992 | Tirfing et al. ......................... | 395/600 |
| 5,197,005 | 3/1993 | Shwartz et al. .................. | 364/419.13 |
| 5,301,317 | 4/1994 | Lohman et al. ...................... | 395/600 |
| 5,315,703 | 5/1994 | Matehny et al. ...................... | 395/164 |
| 5,335,345 | 8/1994 | Frieder et al. ........................ | 395/600 |
| 5,355,320 | 10/1994 | Erjavic et al. ....................... | 364/488 |
| 5,355,474 | 10/1994 | Thuraisngham et al. ............. | 395/600 |
| 5,379,366 | 1/1995 | Noyes ................................... | 395/54 |
| 5,379,419 | 1/1995 | Heffernan et al. .................... | 395/600 |
| 5,386,556 | 1/1995 | Hedin et al. .......................... | 395/600 |
| 5,388,196 | 2/1995 | Pajak et al. .......................... | 395/153 |
| 5,408,655 | 4/1995 | Oren et al. ............................ | 395/600 |

OTHER PUBLICATIONS

Ozsu; "Query processing issues in Object–Oriented Database Systems Preliminary Ideas."; IEEE; 1991; pp. 312–324.

Chimenti et al; "The LDL System Prototype."; IEEE; 1990; vol. 2; Issue 1; pp. 76–90.

Sheu et al.; "Query Optimization in Distributed Logic–oriented Object bases."; 1988; pp. 520–527.

Topaloglou et al.; "Query Optimization for KBMSs: Temporal, Syntactic and Semantic Transactions."; IEEE; 1992; pp. 310–319.

Y. Arens, et al., "Retrieving and Integrating Data from Multiple Information Sources", International Journal on Intelligence and Cooperative Information Systems, vol. 2, No. 2, published 1993, pp. 127–158.

*Primary Examiner*—Thomas G. Black
*Assistant Examiner*—Hosain T. Alam

[57] ABSTRACT

Techniques for optimizing queries in a system in which executing the query requires retrieval of information from a number of different data bases which are accessible via a network. In the techniques, a query results in a query plan which includes subplans for querying the data bases which contain the required information. When a subplan is executed in one of the data bases, the data base returns not only the information which results from the execution of the subplan, but also source and constraint information about the data in the data base. The source and constraint information is then used to optimize the query plan by pruning redundant subplans. An embodiment is disclosed in which queries are made to a domain model implemented using a knowledge base system. The domain model includes a world view of the data, a set of descriptions of the data bases, and a set of descriptions of how to access the data. The information in the domain model is used to formulate the query plan.

12 Claims, 4 Drawing Sheets

FIG. 3

Algorithm GenerateSubPlan ($E(\bar{W}), C(\bar{W}), \mathcal{SD}$)

$E(\bar{W})$ is a query on a single world-view relation, $C(\bar{W})$ is a constraint on the tuples that need to be computed, and $\mathcal{SD}$ is the collection of site descriptions. The output is a collection of sub-plans, one for each of the relevant site descriptions in $\mathcal{SD}$.

The following steps are performed for each site description $SD \in \mathcal{SD}$.

1. If $SD$ is of the form (1) or (2), i.e., $$C_R(\bar{Y}), R_1(\bar{X}_1), \ldots, R_k(\bar{X}_k) \subseteq C_E(\bar{W}), E(\bar{W})$$
$$C_R(\bar{Y}), R_1(\bar{X}_1), \ldots, R_k(\bar{X}_k) = C_E(\bar{W}), E(\bar{W})$$

and $C(\bar{W}) \wedge C_E(\bar{W})$ is satisfiable, generate a sub-plan for answering a fragment of E using traditional query optimization techniques on the conjunctive query:

$$\pi_W(\sigma_{C_R(\bar{Y}) \wedge C(\bar{W})}(R_1(\bar{X}_1) \bowtie \ldots \bowtie R_k(\bar{X}_k))).$$

2. If $SD$ is of the form (3) or (4), i.e., $$C_R(\bar{X}), R(\bar{X}) \subseteq C_E(\bar{Y}), E_1(\bar{X}_1), \ldots, E(\bar{W}), \ldots, E_k(\bar{X}_k)$$
$$C_R(\bar{X}), R(\bar{X}) = C_E(\bar{Y}), E_1(\bar{X}_1), \ldots, E(\bar{W}), \ldots, E_k(\bar{X}_k)$$

$C_E(\bar{Y}) \wedge C(\bar{W})$ is satisfiable, and $\bar{X}$ (the variables of the site relation R) contain the variables of $\bar{W}$, generate a sub-plan for answering a fragment of E using traditional query optimization techniques on the conjunctive query:

$$\pi_W(\sigma_{C_R(\bar{X}) \wedge C(\bar{W})}(R(\bar{X}))).$$

3. In the case when E is a unary concept relation, we perform the first two steps for concept relations E' that are subconcepts of E.

Algorithm DynamicPlanEval $(Q(\bar{X}), \mathcal{SD})$
$Q(\bar{X})$ is the query, and $\mathcal{SD}$ is the collection of site descriptions.

1. Determine an order $E_1(\bar{X}_1), \ldots, E_k(\bar{X}_k)$ of joining the conjuncts in $Q(\bar{X})$.

Let $P_i, 0 \leq i \leq k$ denote a set of pairs of the form $(\bar{t}, C(\bar{Y}))$, where $\bar{t}$ is a tuple in the join of relations $E_1, \ldots, E_i$, and $C(\bar{Y})$ is a constraint, computed as described below. $P_0$ is defined to have a single pair, whose tuple component has the empty tuple and whose constraint component has $C_Q$, the query constraints.

2. Perform the following steps for $i = 1$ to $k$.

(a) For each tuple $(\bar{t}, C(\bar{Y})) \in P_{i-1}$ do

405 {
      i. Let $C_i(\bar{X}_i)$ denote the projection of $C(\bar{Y})$ on the variables in $\bar{X}_i$.
      ii. Generate a sub-plan for computing the tuples in the relation $E_i(\bar{X}_i)$ satisfying the constraint $C_i(\bar{X}_i)$, using the site descriptions $\mathcal{SD}$.

407 {
      iii. Let $\bar{t}_i$ be a tuple computed for $E_i$ using a site description $SD$. Let $C_i'(\bar{X}_i)$ denote the projection of $C_E^{SD} \wedge C_R^{SD}$ on the variables $\bar{X}_i$, where $C_E^{SD}$ and $C_R^{SD}$ are the constraints on the two sides of the site description $SD$. ⌞ 409
      For each tuple $\bar{t}_i$ in $E_i$ and matching $C_i'(\bar{X}_i)$, add the pair $(\bar{t} \cdot \bar{t}_i, C(\bar{Y}) \wedge C_i'(\bar{X}_i))$ to $P_i$, where $\bar{t} \cdot \bar{t}_i$ denotes concatenation of tuples.

3. The answers to the query can be computed from $P_k$ by taking each tuple in the tuple component and projecting it on the variables of $Q(\bar{X})$.

---

401

APPARATUS AND METHODS FOR RETRIEVING INFORMATION BY MODIFYING QUERY PLAN BASED ON DESCRIPTION OF INFORMATION SOURCES

RELATED APPLICATIONS

The present application is a continuation-in-part of U.S. Ser. No. 08/203082, *Apparatus and Methods for Retrieving Information*, Thomas Kirk, et al., filed Feb. 28, 1994 and owned by the assignee of the present application.

BACKGROUND OF THE INVENTION

1. Field of the Invention

The invention concerns information retrieval generally. More specifically, the invention concerns optimization of query plans for retrieving information from a number of information sources.

2. Description of the Prior Art

Networks now connect computers with information sources located anywhere in the world. The Internet, for example, provides access to a large and diverse body of information, such as technical papers, public domain software, directory services and various databases (e.g., airline schedules, stock market listings). It is thus now possible to speak of global information systems.

Being aware that interesting and useful information exists is insufficient if one cannot find the relevant information sources. The large variety of information sources, and the disparity of interfaces among them renders the task of locating and accessing information over the network even more difficult. In order to address some of these problems, it is important to understand the characteristics of the available information sources.

Autonomy: The first characteristic is the autonomy of the information sources. This means that the information sources (i.e., sites) maintain and update their own data, and they are not willing to change their operations to suit the needs of the global information system. At best, an information source is willing to provide a description of its contents.

Dynamic nature: The second characteristic of information sources is their dynamic nature. Specifically, new information sources are added, while existing information sources disappear or arc no longer maintained.

Number of sources: The third characteristic is the very large number of information sources.

Cost of access: The fourth characteristic is that accessing an information source over the network is expensive (both in time and possibly in money).

The first characteristic distinguishes global information systems from distributed databases, where the information sources are not autonomous, but under the control of co-operating database administrators. The second characteristic sets apart global information systems from enterprise-wide databases, where the set of information sources are relatively stable (though the contents may change, of course). The third characteristic differentiates global information systems from current day multidatabases, that is, systems in which the information is contained in a number of different kinds of data base systems.

These characteristics of the information sources necessitate the following features in an architecture for global information systems.

World-view: A consequence of the very large number of information sources is that it is unreasonable to expect users to interact separately with each source. The users need a conceptually uniform view of the information space, against which they can formulate queries. However, there does not have to be a single such view of the information, but there can be many user and domain-specific world-views. In order to relate the contents of the information sources with the world-view, we need site descriptions.

Expressive site descriptions: A consequence of the large number of information sources and the high cost of accessing these sources is that in answering queries, a global information system must minimize the number of information sources (i.e., sites) that are accessed. Therefore, a key requirement of the site descriptions is that they be rich enough to express various constraints that enable the system to prune the sources accessed.

Extensibility: A consequence of the dynamic nature of the information sources is that it should be possible to easily extend the world-view to manage new kinds of information provided by the sources.

Query only: A consequence of the autonomy of information sources is that while a global information system might be able to support global querying, it is unreasonable to expect that it will support global updating.

The parent of the present patent application disclosed an information retrieval system having some of the above features.

That information retrieval system, shown as system 101 in FIG. 1 of the present patent application, has a knowledge base system 109 which includes a domain model 111. Domain model 111 is a model of information from a specific domain. Domain model 111 has three components: world view 115, information source descriptions 113, and system-network view 117. All of these components include concepts belonging to domain model 111. World view 115 is the part of domain model 111 which is visible to a user of system 101. World view 115 is a conceptually unified view of the information space. In a preferred embodiment, world view 115 is implemented as an expressive object/relational data model. The user can pose queries in terms of the objects and the relations in the world-view, unburdened by details of data location and access. World-views are purely conceptual; all the data required to answer queries is present only in site relations at external information sources. World view 115 is related to the information in information sources 123 by means of information source descriptions 113 which provide descriptions of the contents of information sources 123 and by means of system-network view 117, which describes how the information in a particular information source 123 is accessed.

World view 115, information descriptions 113, and system-network view 117 all include concepts in domain model 111. Knowledge base system 109 is able to classify new concepts and add them to the hierarchy of concepts already in domain model 111. Thus, if knowledge base system 109 receives information about a new information source 123, it automatically classifies new concepts relating to the information source in domain model 111.

Access plan generation and execution 119 in FIG. 1 poses sub-queries to the external sources that contain information relevant to answering the query and combines the answers to these sub-queries to answer the user query. Accessing information sources over the network is expensive, and so an important problem in generating access plans is minimizing the number of external information sources 123. It is an object of the present patent application to provide improved techniques for such minimization.

SUMMARY OF THE INVENTION

The basis for the improved minimization techniques of the present invention is an expansion of the data model to include many relations as well as concepts and roles. The expanded data model in turn permits a site description language which provides the information needed for the minimization techniques. A site description language relates the contents of a site (information source 123) with the world-view. Key aspects of the site description language that are useful in answering queries efficiently are the following: (1) Relating the semantic contents of relations in sites to relations in world-view 105 (note that, in particular, relating semantic content includes relating schema information), (2) Stating that a site relation contains complete information about a fragment of the world-view, and (3) Specifying the query forms that an information source can answer efficiently.

The site descriptions of the invention, finally permit novel query optimization techniques that minimize the number of site relations accessed. The optimization techniques are the following: (1) using constraints in the site descriptions and the query to prune the set of site relations that are irrelevant to the query, and (2) using information about completeness of site relations to prune redundant site relations.

An important aspect of the optimization techniques is that optimization is done dynamically. In traditional database query optimization, the query plan is generated completely at compile-time, and is not modified at run-time. As pointed out in the parent of the present patent application and disclosed in detail herein, it is crucial to have dynamic query plans, where the query plan generation phase interacts with the plan execution phase. Also disclosed is an algorithm for producing a dynamic query plan.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 3 shows the algorithm employed in the preferred embodiment to generate query subplans;

FIG. 4 shows the algorithm employed in the preferred embodiment for dynamically generating a query plan.

Figure 1:
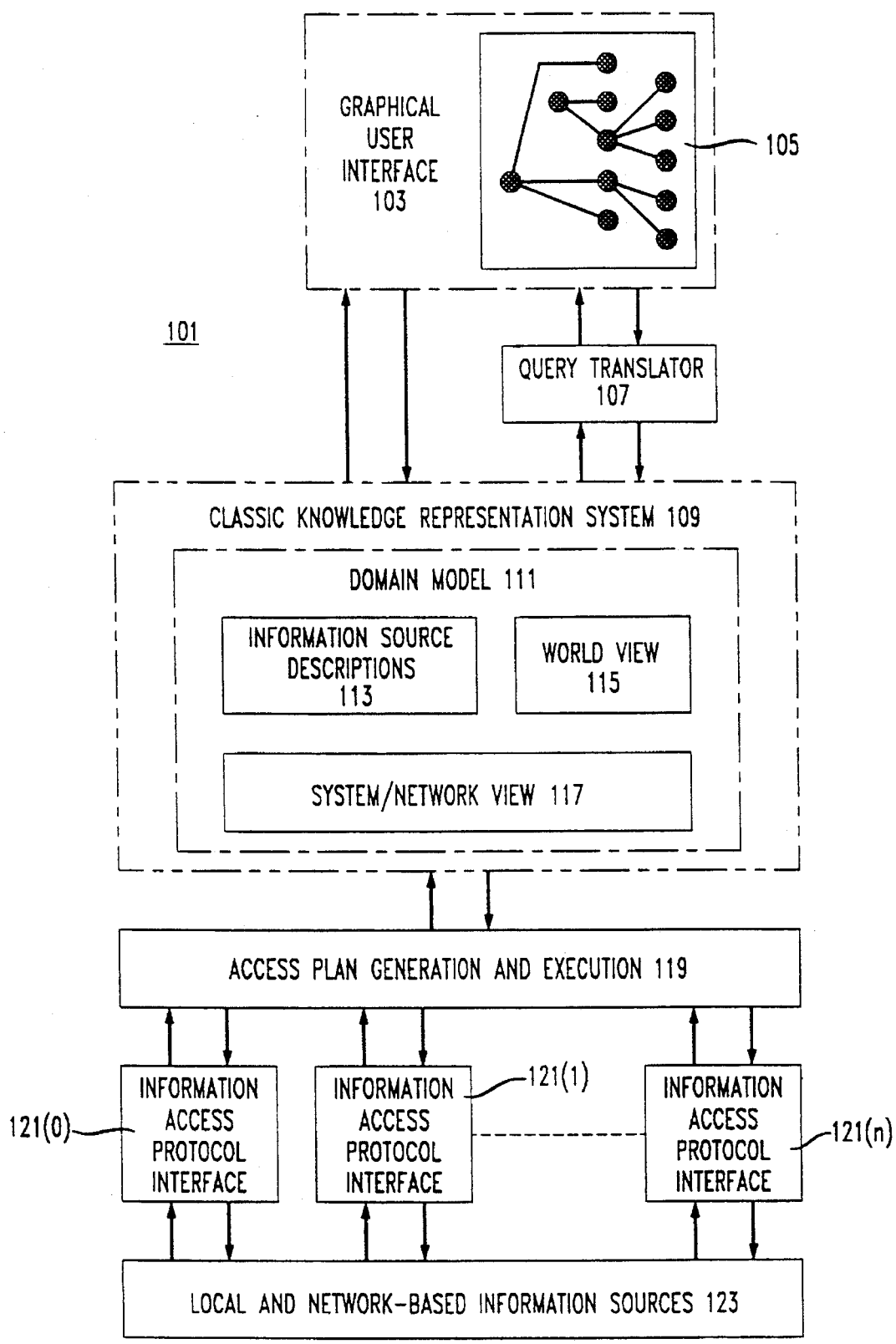
FIG. 1 is a conceptual overview of the information retrieval system described in the parent of the present application.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description contains material from the detailed description of the parent of the present application through the section titled Site Description Language; the new material which is being added in the present application begins at the section titled Improvements in System 101.

Architecture

Architecture Overview

FIG. 1 presents an overview of an information retrieval apparatus 101 which incorporates the principles of the invention. A preferred embodiment of information retrieval apparatus is implemented using a digital computer system and information sources which are accessible via the Internet communications network.

The central component of apparatus 101 is a knowledge base 109 built upon a description logic based knowledge representation system (CLASSIC in the preferred embodiment) which is capable of performing inferences of classification, subsumption, and completion. Knowledge-base systems are described generally in Jeffery D. Ullman, *Principles of Database and Knowledge-base Systems*, Vols. I–II, Computer Science Press, Rockville, Md., 1989. Descriptions of CLASSIC may be found in Alex Borgida, Ronald Brachman, Deborah McGuinness, and Lori Resnick, "CLASSIC: A Structural Data Model for Objects", in *Proceedings of the 1989 ACM SIGMOD International Conference on Management of Data*, pp. 59–67, 1989, R. J. Brachman, et al., "Living with CLASSIC", in: J. Sowa, ed., *Principles of Semantic Networks: Explorations in the Representations of Knowledge*, Morgan-Kaufmann, 1991, pp. 401–456, and L. A. Resnick, et al., *CLASSIC: The CLASSIC User's Manual*, AT&T Bell Laboratories Technical Report, 1991.

Knowledge base, 109 is used to construct a domain model 111 which organizes information accessible via apparatus 101 into a set of concepts which fit the manner in which the user of system 101 is intending to view and use the information. In system 101, domain model 111 has three components: world view 115, which contains concepts corresponding to the way in which a user of the system looks at the information being retrieved, system/network view 117, which contains concepts corresponding to the way in which the information is described in the context of the data bases which contain it and the communications protocols through which it is accessed, and information source descriptions 113, which contains concepts describing the information sources at a conceptual level. System/network view 117 and information source descriptions 113 are normally not visible to the user. The concepts in these portions of domain model 111 do, however, participate fully in the reasoning processes that determine how to satisfy a query.

An important benefit of using a description logic system like CLASSIC is that as new information is added to the system, much of the work of organizing the new information with respect to the concepts already in knowledge base 109 is done automatically. Only a description of the known attributes of the information must be specified; CLASSIC's inference mechanisms then automatically classify these descriptions into appropriate places in the concept hierarchy.

User interaction with the system is accomplished through browsing and querying operations in terms of high-level concepts (concepts that are meaningful to a user unsophisticated in the details for information location and access). These concepts are intended to reflect the terms in which the user thinks about the type and content of information being queried. By working with these high-level concepts, the user is unburdened with the details of the location and distribution of information across multiple remote information servers.

Information sources 123 are generally (though not limited to) network-based information servers that are accessed by standard internet communication protocols. Sources can also include databases, ordinary files and directories, and other knowledge bases.

User Interface

The user interacts with the system through a graphical user interface 103. The two primary modes of interaction supported by this interface are querying and browsing. In both cases the user expresses both browsing and querying operations in terms of concepts from "world view" portion 115 of domain model 111.

A knowledge base browser in CLASSIC 109 allows the user to view and interactively explore the concept taxonomy. The concept taxonomy is represented graphically as a directed graph 105, where the nodes correspond to concepts and edges indicate parent/child relationships among concepts.

To support extension of the concept taxonomy, the knowledge base browser also serves as an editor, allowing the user to define new concepts in terms of existing ones. The classification inferences in knowledge representation system 109 automatically place new concepts at the correct place in the taxonomy with respect to existing concepts.

Since both the high-level world concepts 115 and low-level system concepts 117 coexist in a single domain model 111, an important role of user interface 103 is to filter the system concepts out of the view seen by the user in query results and in the taxonomy browser.

Query Translator 107

The query language used in system 101 is based on CLASSIC, but has additional constructors that enable the user to express queries more easily. The query is formulated in terms of the concepts and objects that appear in the world view part 115 of the knowledge base. Query translator 107 translates queries expressed in the query language into CLASSIC description language expressions which are used to consult the knowledge base. Due to the limited expressive power of the description language and the need for special purpose query operators, the query language may contain elements not expressible in the description language of knowledge representation system 109. After partial translation to a description language expression, the remaining fragments of the query are translated to procedural code that is executed as part of the query evaluation.

Knowledge Representation System 109

The knowledge base is a virtual information store in the sense that the information artifacts themselves remain external to the knowledge base; the system instead stores detailed information (in terms of domain model 111) about the location of these information artifacts and how to retrieve them. Retrieval of a particular piece of information is done on demand, when it is needed to satisfy part of a query. The types of information managed in this manner include files, directories, indexes, databases, etc.

The domain model embodied in the knowledge base is logically decomposed into world view 115, system/network view 117, and information source descriptions 113 World view 115 is the set of concepts with which the user interacts and queries are expressed. System/network view 117 concerns low level details which, though essential for generating successful query results, are normally of no interest to the user. Information source descriptions 113 is a collection of concepts for describing information sources. These information source descriptions are expressed in terms of both world and system concepts. The purpose of encoding information source descriptions 113 in the domain model is to make it possible for CLASSIC to reason about what information sources must be consulted in order to satisfy a query.

We define system concepts comprising system/network view 117 as those concepts that describe the low-level details of information access. This includes concepts related to network communication protocols, location addressing, storage formats, index types, network topology and connectivity, etc. Since the knowledge base generally merely retrieves information instead of storing previously-retrieved information, system/network view 117 includes all those concepts relevant to determining attributes like location, retrieval methods, and content format.

Continuing in more detail, concepts within world view 115 describe things with which the user is familiar; they are the concepts that describe characteristics of information artifacts of interest to users. Concepts within information source descriptions 113 relate the concepts in world view 115 to concepts concerning the semantic content of information sources. Thus, given a query which employs concepts in world view 115, knowledge representation system 109 can employ the concepts in information source descriptions 113 to relate the concepts used in the query to actual information sources and can employ system/network view 117 to relate the concepts used in the query to an access plan which describes how to retrieve information from the sources as required to answer the query.

Access Plan Generation and Execution

When a user wishes to obtain information, the user inputs a query in system 101's query language at graphical user interface 103. System 101 then answers the query. There are several steps involved. First, query translator 107 translates the query into a form to which knowledge representation system 109 can respond. Then the translated query is analyzed in knowledge base system 109 to decide which of the external information sources are relevant to the query, and which subqueries need to be sent to each information source. This step uses world view 115 and system/network view 117. The information in system/network view 117 is expressed in a site description language which will be described in more detail later.

Knowledge base 109 uses the conceptual information from world view 115 and system/network view 117 to produce an information access description describing how to access the information required for the query in information sources 123. Knowledge base 109 provides the information access description to access plan generation and execution component 119, which formulates an access plan including the actual commands needed to retrieve the information from sources 123.

1. Plan formulation: Given the information access description, planner 119 decides on the order in which to access sources 123 and how the partial answers will be combined in order to answer the user's query. The key distinction between this step and traditional database techniques is that planner 119 can change the plan after partial answers are obtained. Replanning may of course involve inferences based on concepts from information source descriptions 113 and/or system/network view 117 and the results of the search thus far.

2. Plan materialization: The previous step produced a plan at the level of logical source accesses. This step takes these logical accesses and translates them to specific network commands. This phase has two aspects:

> Format translation: the description of the sites is given at a logical level. However, to actually access the site, one must conform to a syntax of a specific query language. In this step, these translations are done.
>
> Specific network commands are generated to access the sites. Here, information from the system/network view is taken into account. Depending on the site being accessed, the system will generate the appropriate commands for performing the access.

The translations to service and site-specific access commands are performed by Information Access Protocol Modules 121 (0 . . . n), described in the following section.

Several points should be noted about the above process:

In executing the plan, system 101 uses a work space in the computer system upon which system 101 is implemented to store its intermediate results.

After executing part of the plan, system 101 may decide to replan for the rest of the query.

Information Access Protocol Modules 121

Access to information sources is done using a variety of standard information access protocols. The purpose of these modules is to translate generic information access operations (retrieval, listing collections, searching indexes) into corresponding operations of the form expected by the information source. For many standard Internet access protocols, the translation is straightforward.

Examples of access protocols supported by these modules include several network protocols defined by Internet RFC draft standard documents, including FTP (File Transfer Protocol), Gopher, NNTP (Network News Transfer Protocol), HTTP (Hypertext Transfer Protocol). In addition, other modules support access to local (as opposed to network-based) information repositories, such as local file-systems and databases.

Site Description Language

As previously pointed out, the concepts in information source descriptions 113 relate concepts in world view 115 to information sources 123. These relationships are expressed using a site description language. CLASSIC and related knowledge representation systems employ description languages which can function as site description languages, but such site description languages do not permit efficient reasoning. In a preferred embodiment, efficiency has been substantially increased by the use of a site description language which extends CLASSIC.

The following discussion of the site description language employed in the preferred embodiment employs the example below:

Consider an application in which we can obtain information about airline flights from various travel agents. We have access to fares given by specific travel agents and to telephone directory information to obtain their phone numbers. In practice, the information about price quotes and telephone listings may be distributed across different external database servers which contain different portions of the information. For example, some travel agent may deal only with domestic travel, another may deal with certain airlines. Some travel brokers deal only with last minute reservations, e.g., flights originating in the next one week. Similarly, directory information may be distributed by area code. In some area codes, all listings may be in one database, while others may partition residential and business customers.

The starting point for the site description language is the description language used in CLASSIC. A description language consists of three types of entities: concepts (representing unary relations), roles (binary relations) and individuals (object constants). Concepts can be defined in terms of descriptions that specify the properties that individuals must satisfy to belong to the concept. Binary relationships between objects are referred to as roles and are used to construct complex descriptions for defining concepts. Description logics vary by the type of constructors available in the language used to construct descriptions. Description logics are very convenient for representing and reasoning in domains with rich hierarchical structure. Description languages other than the one uses in CLASSIC exist and may be used as starting points for site description languages. The only requirement is that the question of subsumption (i.e., does a description $D_1$ always contain a description $D_2$) be decidable. We denote the concepts in our representation language by $\mathcal{D}=D_1, \ldots, D_l$.

In our example, we can have a hierarchy of concepts describing various types of telephone customers. The concept customer is a primitive concept that includes all customers and specifically the disjoint subconcepts *Business* and *Residential*. Each instance of a business customer has a role BusinessType, specifying the types of business it performs. Given these primitive concepts, we can define a concept TravelAgent by the description (AND Business (fills BusinessType "Travel")).

One limitation of description languages is that they do not naturally model general n-ary relations (A relation may be thought of as a a table with columns and rows. An n-ary relation has n columns.) n-ary relations arise very commonly in practice and dealing with such relations is essential to modeling external information sources that contain arbitrary relational databases. Hence our representation language augments description languages with a set of general n-ary relations $\mathcal{E}=E_1, \ldots, E_n$. It should be emphasized that the general n-ary relations are not part of the description language. Hereafter, we refer to the set of relations, $\mathcal{E} \cup \mathcal{D}$ as the knowledge base relations, to distinguish them from relations stored outside knowledge representation system 109. Our application domain is naturally conceptualized by the following two relations:

Quote(ag, al, src, dest, c, d), denotes that a travel agent ag quoted a price of c to travel from src to dest on airline al on date d.

Dir(cust, ac, telNo), gives the directory listing of customer cust as area code ac and phone number telNo.

A key aspect of our representation language is the ability to capture rich semantic structure using constraints, with which CLASSIC can reason efficiently. An atomic constraint is an atom either of the form D(x), where D is some concept in $\mathcal{D}$, and x is a variable, or $(x_i \ \theta x_j)$ (or $(x_i \ \theta \ \alpha)$) where $x_i$ and $x_j$ are variables, $\alpha$ is a constant and $\theta \in \{>, \geq, <, \leq, =, \neq\}$. Arbitrary constraints are formed from atomic constraints using logical operators $\wedge$ and $\vee$. CLASSIC can determine efficiently whether one class subsumes another using subsumption reasoning in the description logic. Other well-known techniques are used for implication reasoning of order constraints. For details, see the Ullman reference cited above. Any atomic constraint may be used about which implication/subsumption reasoning can be done efficiently. Constraints play a major role in information gathering and are used in several ways. First, semantic knowledge about the general n-ary relations $\mathcal{E}$ can be expressed by constraints over the arguments of the relations. In our example, we can specify that the first argument of the relation Quote must be an instance of the concept TravelAgent. Second, as we discuss in subsequent sections, constraints can be used to specify subsets of information that exist at external sites. For example, a travel agent may have only flights whose cost is less than $1000. Finally, as we see below, constraints are extremely useful in specifying complex queries.

Constraints may be used together with concepts and knowledge base relations to describe properties of extensions of the knowledge base relations, that is, information specified by the knowledge base relations and the properties. The information in the extension may come from the knowledge base, but most often it will come from one or more of the information sources 123. We assume that the definitions of the concepts exist in the knowledge base, although the extensions of the concepts and the relations may not be entirely present in the knowledge base. However, we assume that constraints contain only concepts whose extensions exists in the knowledge base.

Given a query (defined formally below), the knowledge base system must infer the missing portions of the extensions of relations needed to answer the query, using the information present at the external sites. For the purpose of our discussion, the knowledge base can also be viewed as an information source containing part of the extensions.

It should be realized that the problem of finding relevant sites is a crucial problem for system 101. Economical solutions to the problem are important not only for answering queries, but also for other operations. Examples include Processing updates on the knowledge base requires updating relevant site relations and hence, determining the relevant sites.

Efficiently monitoring queries over time requires determining precisely which external site relations should be monitored.

Maintaining consistency among site relations again requires that we determine which sites contain information relevant to a given consistency condition.

Finding the relevant sites is done by extending the algorithm described in Alon Y. Levy and Yehoshua Sagiv, "Constraints and Redundancy in Datalog", Proceedings of the Eleventh ACM SIGACT-SIGMOD-SIGART Symposium on Principles of Database Systems, San Diego, Calif., 1992. The key observation that enables us to use that algorithm is that the language for expressing constraints (concept descriptions and order constraints) satisfies the requirements of the query-tree algorithm outlined in that paper. Finding minimal portions of the sites is done in two steps. The first step determines which portions of the knowledge base relations are needed to solve the query, and the second step determines which portions of the site relations are needed to compute the relevant portions of the knowledge base relations. The algorithm uses the query-tree, which is a tool that, given a query which is expressed in terms of certain relations will specify which portions of the mentioned relations are relevant to the query. The first step is done by building a query-tree for the user query, in terms of the knowledge base relations, and pushing the constraints from the query to the KB relations. The second step is done by building a query-tree for each relevant KB relation (which is defined in terms of the external sites), and pushing the constraints to the external site relations.

Improvements in System 101

The following detailed description of the improvements in system 101 of the parent application begins with a description of the query language used in system 101. Then come a description of an improved site description language and a description of how the improved site description language can be used to optimize queries. Finally, them is a description of dynamic query optimization. The discussion employs the following running example:

EXAMPLE 5.1

There are currently many systems providing access to large collections of database. Consider such a system, which provides access to two kinds of databases: (1) the flight information and price quote databases of various airlines and travel agents in the U.S., and (2) the telephone directory databases of various telephone companies in the U.S., to obtain the phone numbers of the various travel agents.

These different databases often contain the same information redundantly. For example, the United Airlines database contains information about United flights and price quotes, while the database of some travel agent may have flight and price quote information about domestic flights in the U.S. Similarly, the telephone directory information may exist in databases distributed by area code, or in databases distributed by types of customers (e.g., travel agents).

A user accessing this collection of databases may be interested in obtaining a variety of information, e.g., the cheapest flight offered by any airline or travel agent, the phone number of travel agents who offer the cheapest deals, etc. A key problem facing the user of such a current day system is that to find information of interest, the user needs to search the various databases one by one, which is extremely time-consuming and expensive. This problem is exacerbated by the fact that the price quote databases, for example, provided by different travel agents may use different schemas, and different conventions for representing their information. □

World-View 115

World-view 115 in the preferred embodiment consists of the following types of entities:

General n-ary relations: The attribute values of these relations are drawn from a rich set of types, which includes primitive types such as integers and strings, as well as more complex types defined by CLASSIC concepts (described below). We refer to these relations by $\mathcal{E}$.

Concepts and objects: The data model of the world-view includes CLASSIC concepts and objects. In CLASSIC, concepts (which correspond to classes in object-oriented databases) are defined in terms of descriptions that specify the properties that objects must satisfy in order to belong to the concept. A collection of CLASSIC concepts can be viewed as a rich type hierarchy.

A concept can itself be viewed as a unary relation; the extension of this relation is the collection of all objects that satisfy the concept description. We denote the concepts in world-view 115 by $\mathcal{D}$. The set of relations $\mathcal{W} = \mathcal{D} \cup \mathcal{E}$ are collectively referred to as the world-view relations, and are type-set in this font.

Constraints: An important part of the data model of the world-view is the ability to express rich semantic information about the world-view relations using constraints, such as order constraints (e.g., AC=212, Cost<1000). Note that concepts can also be used to express semantic constraints.

Having general n-ary relations in the world-view is essential for modeling sites that contain arbitrary relational databases. (This feature is not present in the world-view of the SIMS system, for example.) For details on SIMS, see Y. Arens, C. Y. Chee, C. nan Hsu, and C. A. Knoblock, "Retrieving and integrating data from multiple information sources", *International Journal on Intelligent and Cooperative Information Systems,* 1994. However, a well-known problem with the relational data model is that it does not provide a rich type structure for values that occur in argument positions of relations. Allowing for values to be drawn from a rich set of types would considerably increase the modeling capabilities of the relational data model. This is achieved in our world-view by augmenting the relational model with CLASSIC's object-oriented model.

Note that our world-view does not explicitly include object attributes. The reason is that an attribute A of a concept C can be viewed as a binary relation, where the first argument of the relation is of type C and the second argument of the relation has the type of attribute A as its type. This is just a special case of general n-ary relations, which are included in our world-view.

Constraints play a central role in the world-view for expressing semantic information. We show how this semantic information is used for efficiently answering queries further on. In principle, our world-view allows constraints to be expressed using any domain where implication (i.e., subsumption) reasoning can be done efficiently. For order constraints, implication reasoning can be done in polynomial-time (see Ullman, supra). Subsumption reasoning in CLASSIC can also be done in polynomial-time (see A. Borgida and P. F. Patel-Schneider. "A semantics and complete algorithm for subsumption in the CLASSIC description logic", *Journal of Artificial Intelligence Research,* 1:277–308, June 1994.)

EXAMPLE 5.2

Consider the airline flight application of Example 5.1. World-view 115 in this case is naturally conceptualized by the following relations:

quote(Ag, Al, Src, Dst, C,D), denotes that a travel agent Ag quotes a price of C to travel from Src to Dst on airline Al on date D.

dir(Cust, Ac, TelNo), gives the directory listing of customer Cust as area code Ac and phone number TelNo.

areaCode(Pl, Ac) gives the area code(s) associated with place Pl.

The world-view also has a rich type hierarchy of CLASSIC concepts describing, e.g., various types of telephone customers. The concept customer is a primitive type that includes all telephone customers and specifically the disjoint subconcepts business and residential.

Constraints are used to specify types of the attributes of the world-view relations. For example, the attribute Cust of relation dir is constrained to be of type customer, the attribute Ag of relation quote is constrained to be of type travelAgent (a subconcept of business) and the attribute C of quote is constrained to have non-negative values. □

Using CLASSIC in the World-View

CLASSIC is a member of a family of description logic systems. There are several advantages to using a description logic system as part of the domain model component of a global information system. The key advantage is their ability to support extensibility and modifiability of domain model 111. Although the world-view portion of domain model 111 should be relatively stable, the dynamic nature of the information sources will unavoidably lead to changes in the information descriptions 113 and system/network view 117 portions of domain model 111. (e.g., new specialized services often get created, transient discussion topics arise frequently, etc.). Even with world view 115, users may want to make a personal version of world view 115 by defining new concepts and relations, creating new objects, and asserting constraints about the world-view relations (e.g., a user may want to define the set of universities with a researcher working on global information systems).

A system such as CLASSIC supports extensibility by allowing new concepts to be created and automatically placed in the concept hierarchy. For example, suppose the concept hierarchy included the concepts business and airline_agent (defined as a subconcept of business that has fillers "travel" and "airline" for attribute business_type). If the user wanted to add a new concept travel_agent (defined as a subconcept of business that has a filler "travel" for attribute business_type), CLASSIC would automatically place this new concept in the concept hierarchy between business and airline_agent. This would not be possible in object-oriented database systems that require the class hierarchy to be explicitly created by the user.

A second advantage is that description logic systems do not require the user to explicitly specify all concepts to which an object belongs. Instead, such systems automatically classify objects in the appropriate concepts, based on the definitions of the concepts and the information available about the object. For example, suppose the concept hierarchy included the concepts www_site and ftp_site (which is defined to be the subconcept of www_site whose URL attribute begins with the string ftp :). If the user creates an object as an instance of www_site with its URL as ftp://research.att.com, then the system will also classify it as an instance of ftp_site; this classification is needed to use the appropriate protocol when accessing the site. Current day object-oriented database systems do not allow such automatic classification of objects.

Description logic systems provide varying degrees of expressivity in their concept definition language. Consequently, they vary considerably in the complexity of subsumption reasoning (i.e., does concept $C_1$ subsume concept $C_2$). CLASSIC stands out in this family as a language which has been carefully designed so that subsumption reasoning is in polynomial-time, while still being expressive, and has been used in large-scale commercial applications.

Finally, the most significant limitation of description logic systems is that their scale-up suffers in the presence of large collections of objects. However, this limitation does not impact on the use of CLASSIC in our world-view, since the world-view relations are not explicitly stored; information is explicitly stored only in the external information sources.

The Query Language

Many languages have been proposed for querying object/relational databases Our world-view is also object/relational in nature, synthesizing the relational model with an object-oriented model. Hence, any query language proposed for object/relational databases can be used to query our world-view.

In this paper, for simplicity of exposition, we consider only conjunctive queries of the form:

$$Q(\overline{X}) :- C(\overline{Y}), E_1(\overline{X}_1), \ldots, E_k(\overline{X}_k).$$

The $E_j$'s are relation names from the world-view relations $W$, C is a constraint on the variables of the query, and $\overline{X}, \overline{Y}, \overline{X}_1, \ldots, \overline{X}_k$ are constants, variables, or world-view objects. Constraints in queries are conjunction of order-constraints.

EXAMPLE 5.3

The following query retrieves the names and phone numbers of travel agents in Miami who sell tickets from Newark to Santiago on any airline for under $1000:

```
query(Name, AC, TelNo) :-   quote(Ag, Al, 'Newark, NJ', 'Santiago, Chile', C, D),
                            areaCode('Miami, Fl', AC), dir(Ag, AC, TelNo),
                            name(Ag, Name), C < 1000.
```

This query does not explicitly make use of the world-view concept travelAgent, since the type of Ag in the world-view relation quote is constrained to be the concept travelAgent. □

Typically, languages for querying object/relational databases use SQL-like constructs to access attributes of relations, and "path expressions" to access attributes of objects. In our world-view, concepts can be viewed as unary relations, and object attributes can be viewed as binary relations. Consequently, accessing object attributes using path expressions is equivalent to using a chain of unary and binary relations corresponding to concepts and attributes. For this reason, our queries are conjunctive relational queries expressed in terms of the world-view relations and objects.

Figure 2:
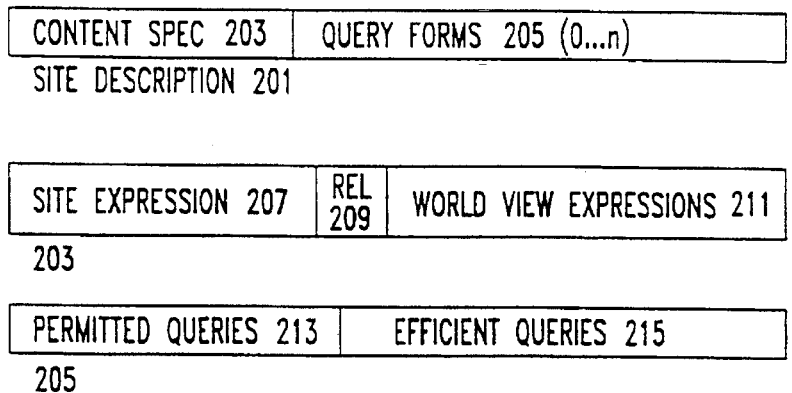
FIG. 2 is a detail of a site description in a preferred embodiment.

Sites and Site Descriptions: FIG. 2

Users pose queries in terms of the relations $W$ of world view 115. However, the world-view relations constitute just a conceptual view; the information required to answer queries is present in the external information sources 123 described in information source descriptions 113. Information sources 123 can be viewed as providing extensions of site relations $\mathcal{R}$ from information source descriptions 113, which are type-set in this font. In order to answer user queries, the system needs a precise description of the site relations $\mathcal{R}$. Such a description is termed herein a site description. As shown in FIG. 2, a site description 201 in a preferred embodiment includes at least two types of information:

content specification 203 which relates the contents of the external relations $\mathcal{R}$ with the world-view relations $W$.

set of query forms 205 (0 ... n) which indicates subsets of queries on the relations $\mathcal{R}$ that the external site is willing to answer.

In a preferred embodiment, there are two subsets of queries indicated by the query forms: those queries which the external site can answer at all and those queries which the external site can answer efficiently. We first present some examples of site descriptions 201 to illustrate specification of content and capability. We then formally describe the language used for content specifications 203.

EXAMPLE 5.4

A travel information source provides directory information for travel agents in the relation travel_dir(Ag, Ac, TelNo). Content specification 203 for this relation specifies that this relation contains telephone information about travel agents in the dir world-view relation, though not necessarily all travel agents.

The query forms 205 for this travel information source specify that this source answers two kinds of queries: first, the information source provides an agent's area code and phone number, given a specific travel agent, and second, the information source provides all travel agents and their phone numbers, given an area code. This information source does not answer queries where none of the arguments is bound to a constant.

The Manhattan directory information source provides the relation bigapple_dir(Cust, TelNo). The content specification 203 for this relation specifies that this relation contains the phone numbers of customers in the 212 area code. In addition, content specification 203 specifies that it has complete information about the phone numbers of customers in the 212 area code, i.e., there is no phone number in the 212 area code which does not exist in the relation bigapple_dir. Specifying completeness information is useful for a query processor to determine that it need not query any other sources for information regarding 212 phone numbers. See O. Etzioni, K. Golden, and D. Weld. "Tractable closed world reasoning with updates", In *Proceedings of KR-94*, 1994. □

Details of Content Specifications 203

A content specification 203 describes the contents of external site relations $\mathcal{R}$ by relating them to the world-view relations $W$. A content specification 203 thus has three parts: a right hand 211 which is a conjunction of expressions involving relations in world view 115, a left hand 207 of expressions involving relations in information source descriptions 113, and a connector 209 between them. In the site description language of the preferred embodiment, a content specification may have one of the following four forms:

$$C_R(\overline{Y}), R_1(\overline{X}_1), \ldots R_k(\overline{X}_k) \subseteq C_E(\overline{X}), E(\overline{X}) \quad (1)$$

$$C_R(\overline{Y}), R_1(\overline{X}_1), \ldots, R_k(\overline{X}_k) = C_E(\overline{X}), E(\overline{X}) \quad (2)$$

$$C_R(\overline{X}), R(\overline{X}) \subseteq C_E(\overline{Y}), E_1(\overline{X}_1), \ldots, E_k(\overline{X}_k) \quad (3)$$

$$C_R(\overline{X}), R(\overline{X}) = C_E(\overline{Y}), E_1(\overline{X}_1), \ldots, E_k(\overline{X}_k) \quad (4)$$

The R's (with or without subscripts) refer to the external site relations, the E's (with or without subscripts) refer to the world-view relations, and the $C_R$'s and $C_E$'s denote constraints (order constraints and CLASSIC concepts). $\overline{X}$ (with or without subscripts) and $\overline{Y}$ denote tuples of variables and/or constants. Each expression must be range-restricted, i.e., $\overline{X} \subset \overline{X}_1 \cup \ldots \cup \overline{X}_k$.

The meaning of an expression is the natural one, given by the following relational algebra expressions (where σ denotes selection, π denotes projection, and ⋈ denotes join). For example, the meaning of content specifications of form (1) is:

$$\pi_{\bar{X}}(\sigma_{C_{R(\bar{Y})}}(R_1(\bar{X}_1) \bowtie \ldots \bowtie R_k(\bar{X}_k))) \subseteq \sigma_{C_{E(\bar{X})}}(E(\bar{X})).$$

The meaning of content specifications of form (4) is:

$$\sigma_{C_{R(\bar{X})}}(R(\bar{X})) = \pi_{\bar{X}}(\sigma_{C_{E(\bar{Y})}}(E_1(\bar{X}_1) \bowtie \ldots \bowtie E_k(\bar{X}_k))).$$

Expressions of the type (1) and (2) differ from expressions of the type (3) and (4) in the following way. The first two specify how fragments of world-view relations can be computed from the site relations, i.e., the world-view relation fragments are akin to traditional views on the site relations and external database schemas in multidatabases. See W. Litwin, L. Mark, and N. Roussopoulos. "Interoperability of multiple autonomous databases", *ACM Computing Surveys*, 22(3):267–293, Sept. 1990. In contrast, the latter two define the contents of fragments of the site relations as views on the world-view relations.

An expression of type (1) specifies that part of the fragment is computed using the description. An expression of type (2) specifies that all of the fragment is computed using the description. The relationship between expressions of type (3) and (4) is the same as the relationship between expressions of type (1) and (2).

EXAMPLE 5.5

Consider our airline flight application. Fly-by-Night Airlines provides two site relations 207: fbn_fights(Flt, Src, Dest), which denotes that flight Flt of Fly-by-Night Airlines is from Src to Dest, and fbn_quote(Ag, Flt, C,D), which denotes that a designated travel agent Ag of Fly-by-Night Airlines quotes a price of C to travel by flight Flt on date D. The world-view relation 211 quote can be related to the contents of the site relations fbn_flights and fbn_quote using a content specification 203 of the form (1) as follows:

fbn_flights(Flt, Src, Dest), fbn_quote(Ag, Flt, C, D)⊆quote(Ag, 'Fly-by-Night', Src, Dest, C,D).

This content specification 203 states that tuples in the relation quote can be computed by joining tuples in the relations fbn_flights and fbn_quote.

Suppose that only the designated travel agents of Fly-by-Night Airlines were allowed to offer quotes on Fly-by-Night Airlines. Then, all the information about fare quotes for this airline is present in the relations fbn_flights and fbn_quote. This complete information can be represented using a content specification 203 of the form (2) as follows:

fbn_flights(Flt, Src, Dest), fbn_quote(Ag, Flt, C, D)=quote(Ag, 'Fly-by-Night', Src, Dest, C, D).

□

EXAMPLE 5.6

Consider the external site relations described in Example 5.4. The external site relation travel_dir contains a listing of travel agents, though not necessarily all of them. This is specified using a content specification of the form (3) as follows:

travel_dir(Ag, Name, Ac, TelNo)⊆dir(Ag, Ac, TelNo), travelAgent(Ag), name(Ag, Name).

This content specification 203 states that the site relation travel_dir already has a subset of the join of the world-view relations dir and travelAgent. □

Our site description language does not allow content specifications 203 of the form:

$C_R(Y), R_1(\bar{X}_1), \ldots, R_k(\bar{X}_k) \supseteq C_E(\bar{X}), E(\bar{X})$ $C_R(\bar{X}), R(\bar{X}) \subseteq C_E(\bar{Y}), E_1(\bar{X}_1), \ldots, E_k(\bar{X}_k)$ Intuitively, these content specifications are not useful because they only provide information about tuples that are "possibly" in the world-view relations, and not about tuples that are "definitely" in the world-view relations. The following example illustrates this point.

EXAMPLE 5.7

The external site relation ta_ia_dir(Ag, Ac, Telno) contains a listing of the phone numbers of all travel agents as well as all insurance agents. The contents of this site relation can be specified using the content specifications:

ta_ia_dir(Ag, Ac, TelNo)⊆dir(Ag, Ac, TelNo), travelAgent(Ag).

ta_ia_dir(Ag, Ac, TelNo)⊆dir(Ag, Ac, TelNo), insuranceAgent(Ag).

Without any means of distinguishing which number in this site relation is the phone number of a travel agent, and which is the phone number of an insurance agent, this site relation is not useful in answering queries on the world-view relation travelAgent. □

Specifying Query Forms 205

Information sources in global information systems are autonomous and, for reasons such as security or privacy, may decide to answer only a subset of the possible queries on the site relations. In our site description language, each information source can specify the subset of queries it is willing to answer using a set of query forms 205 on the site relations provided by the information source. For details on query forms, see J. D. Ullman, *Principles of Database and Knowledge-base Systems, Volumes I and II*, Computer Science Press, 1989.

Intuitively, a query form 205 $m_R$ on a k-ary relation R is a string of length k, using the alphabet {b,f}. A 'b' in the i'th position indicates that the i'th argument of R must be bound to a constant in a query conforming to $m_R$; an 'f' in the i'th position indicates that the i'th argument of R can either be free or be bound to a constant. An information source is willing to answer a query on a site relation if and only the query bindings match one of its query forms.

EXAMPLE 5.8

Consider the external information sources of Example 5.4. The travel information source specifies the subset of queries on relation travel_dir that it is willing to answer as follows:

possible_queries: travel_dir[bff,fbf].

The query form 205 bff indicates that, given a specific travel agent, the information source can provide the agent's area code and phone number. The query form 205 fbf indicates that, given an area code, the information source can provide the travel agents and their phone numbers in that area code. □

Often it is the case that some of the queries that an external information source is willing to answer can be answered efficiently, because of clustering of tuples in the site relations, availability of indices, etc. Answering queries in a global information system can be optimized if this information were available to the query processor. Hence, our site description language also allows external information sources to specify the subset 215 of queries that it can answer efficiently, again using query forms 205.

EXAMPLE 5.9

Consider our airline flight application, and the travel information source which provides the site relation travel_dir. This source is willing to answer queries matching either of the query forms bff and fbf (see Example 5.8). These query forms thus make up the set of permitted queries 213. However, answering queries matching bff might be efficient because of the availability of a primary index on the travel agent attribute, while answering queries matching fbf might be quite inefficient because of the absence of any clustering in the site relation travel_dir. The subset 215 of queries that can be efficiently answered by the travel information source can be specified as follows:

efficient_queries: travel_dir[bff].

☐Of course, the access plan would first attempt to use the efficient queries provided by information source 213 to answer the query, and would specify an inefficient query only if there were no other way to obtain the information.

In other embodiments, site descriptions 201 may include other useful information such as the cost and reliability of accessing tuples of the site relations. Incorporation of these into the site description language requires the development of algorithms that can use this information effectively in query evaluation.

Query Evaluation

Users of a global information system 101 formulate queries in terms of relations in world view 115, without regard to the location and distribution of this information. However, the world-view relations are not explicitly stored; all the data that are needed to answer these queries reside in site relations in external information sources 123. It is the task of the query evaluation system to access these external site relations and answer the user's queries. Since the cost of accessing an information source over the network is significant, the main optimization to be performed is to minimize the number of external information sources 123 that need to be accessed in order to answer the query. In this section, we present several techniques that make effective use of site descriptions to minimize access to external information sources.

Answering Queries: FIG. 3

Answering a query in a database system typically has two phases: generating the plan for answering the query, and executing this plan. In traditional database systems, a query plan specifies the order of computing the joins of the database relations in the query and the techniques used for each of the joins. This requires that each of the database relations mentioned in the query be either stored explicitly, or computed on demand. Since the world-view relations in a global information system are not stored explicitly, the query plan has to compute the tuples in the world-view relations from the tuples in the site relations.

Our algorithm for generating a query plan is shown in FIG. 3. Algorithm 301 operates after a join order for the query has been determined using traditional techniques. Algorithm 301 creates sub-plans for evaluating each of the conjuncts in the query. It does so by determining which external information sources need to be queried in order to obtain tuples of a world-view relation $E(\overline{W})$ that satisfies some constraint $C(\overline{W})$ (which is statically computed from the query). Our algorithm assumes that each external site has the capability of answering any query form. The algorithm can be straightforwardly extended, using the techniques described in K. A. Morris, "An algorithm for ordering subgoals in NAIL!", In *Proceedings of the ACM Symposium on Principles of Database Systems*, pages 82–88, Mar. 1988, to handle cases when only certain query forms can be answered, or when certain query forms can be handled more efficiently.

Algorithm 301 generates a plan that is guaranteed to be sound, i.e., all answers obtained by executing this plan are indeed answers to the query. If all content specifications are of the forms (1) or (2), executing the plan is also guaranteed to generate all possible answers to the query, i.e., our algorithm is also complete.

However, since algorithm 301 tries to answer each conjunct in the query in isolation, it may not find all answers in the presence of content specifications of the forms (3) and (4), as illustrated by the following example.

EXAMPLE 5.10

Consider a query that retrieves names and telephone numbers of travel agents in the 212 (Manhattan, N.Y.) area code.

query(Name, TelNo) :- travelAgent(Ag), dir(Ag, 212, TelNo), name(Ag, Name).

Suppose that the site relation nyTA precisely has the names and telephone numbers of all the travel agents in the 212 area code, specified using the following content specification:

nyTA(Name, TelNo)=travelAgent(Ag), dir(Ag, 212, TelNo), name(Ag, Name).

The answer to the query can be computed by using just the tuples in the external site relation nyTA. However, our algorithm would not be able to determine that the site relation nyTA is useful, since it would try to separately compute the tuples in the world-view relations travelAgent, dir and name, and the nyTA site relation does not have the variable Ag, which is present in each of the three world-view relations. ☐

A complete strategy for answering queries in the presence of content descriptions of the forms (3) and (4) requires solving the problem of answering queries using materialized views. A general solution to this problem which works for a large class of query languages is described in the next section. The work on the general solution resulted in a demonstration that answering queries using materialized views (even when the query and the views are just conjunctive queries) is NP-complete, whereas algorithm 301 presented here is in polynomial time.

A key aspect of algorithm 301 is that it generates a plan that accesses only information sources that can possibly contribute to answering the query, given the static constraints in the query and in the site descriptions. Furthermore, we can extend algorithm 301 to cases in which both the query and the content specifications 203 of the form (1) and (2) involve aggregation, negation and recursion. using techniques described in A. Y. Levy and Y. Sagiv. "Constraints and redundancy in Datalog", In *Proceedings of the Eleventh ACM Symposium on Principles of Database Systems,* San Diego, Calif., June 1992; A. Y. Levy, I. S. Mumick, Y. Sagiv, and O. Shmueli, "Equivalence, query-reachability and satisfiability in Datalog extensions", In *Proceedings of the ACM Symposium on Principles of Database Systems,* Washington, D.C., 1993; and A. Y. Levy, I. S. Mumick, and Y. Sagiv. "Query optimization by predicate move-around", In *Proceedings of the International Conference on Very Large Databases,* Santiago, Chile, Sept. 1994.

Answering Queries using Materialized Views

Answering a query using materialized views can be done in two steps. In the first step, containment mappings from the bodies of the views to the body of the query are considered to obtain rewritings of the query. The appropriate view literals for the rewriting are added to the query. In the second step, redundant literals of the original query are removed. Once this is done, evaluation of the query is done using one of these new versions which is cheaper to evaluate than the original query. The following discussion begins with some preliminary definitions and a running example and then presents detailed descriptions of the two steps.

Preliminaries

In our discussion we refer to the relations used in the query as the database relations. We consider conjunctive and unions of conjunctive queries (i.e., datalog without recursion). In addition, queries may contain built-in comparison predicates ($=, \neq, <$ and $\leq$). We use $V, V_1, \ldots, V_m$ to denote views that are defined on the database relations. Views are also defined using queries. Given a query Q, our goal is to find an equivalent rewriting Q' of the query that uses one or more of the views:

Definition 5.1

A query Q' is a rewriting of Q that uses the views $V=V_1, \ldots, V_m$ if

Q and Q' are equivalent (i.e., produce the same answer for any given database), and Q' contains one or more occurrences of literals of V. □

We consider only rewritings that have the same form as the original query (i.e., they do not use a more expressive query language than the original query).

We say that a rewriting Q' is locally minimal if we cannot remove any literals from Q' and still retain equivalence to Q. A rewriting is globally minimal if there is no other rewriting with fewer literals.[1]

[1] Note that we do not count literals of built-in predicates.

EXAMPLE 5.11

Consider the following query and view:

$q(X,U) :\text{-} p(X,Y),p_0(Y,Z),p_1(X,W),p_2(W,U).$ $v(A,B) :\text{-} p(A,C),p_0(C,B),p_1(A,D)$ The query can be rewritten using v as follows:

$q(X,U) :\text{-} v(X,Z),p_1(X,W),p_2(W,U).$

Substituting the view enabled us to remove the first two literals of the query. Note, however, that although the third literal in the query is guaranteed to be satisfied by the view, we could not remove it from the query because the variable W also appears in the last literal. ■ □

Clearly, we would like to find rewritings that are cheaper to evaluate than the original query. The cost of evaluation will depend on many factors which differ from application to application. In this paper we consider rewritings which reduce the number of literals in the query, and in particular, reduce the number of database relation literals in the query. In fact, we will show that any rewriting of Q that contains a minimal number of literals is isomorphic to a query that contains a subset of the literals of Q and a set of view literals. Although we focus on reducing the number of literals, it should be noted that rewritings can yield optimizations even if we do not remove literals from the query, as illustrated by the following example.

EXAMPLE 5.12

Using the same query as in Example 5.11, suppose we have the following view:

$v_1(A) :\text{-} p(A,C),p_1(A,D)$

We can add the view literal to the query to obtain the following rewritten query.

$q(X,U) :\text{-} v(X),p(X,Y),p_0(Y,Z),p_1(X,W),p_2(W,U).$

The view literal acts as a filter on the values of X that are considered in the query. It restricts the set of values of X to those that appear both in the relation p and $p_1$. ■ □

In some applications we may not have access to any of the database relations. Therefore, it is important to consider the problem of whether the query can be rewritten using only the views. We call such rewritings complete rewritings:

Definition 5.2:

A rewriting Q' of Q, using $V=V_1, \ldots, V_m$ is a complete rewriting if Q' contains only literals of and built-in predicates. □

EXAMPLE 5.13

Suppose that in addition to the query and the view of Example 5.11 we also have the following view:

$v_2(A,B) :\text{-} p_1(A,C),p_2(C,B),p_0(D,E).$

The following is a complete rewriting of q that uses v and $v_2$:

$q(X, U) :\text{-} v(X,Z), v_2(X,U).$

It is important to note that this rewriting cannot be achieved in a stepwise fashion by first rewriting q using v and then trying to incorporate $v_2$ (or the other way around). Finding the complete rewriting requires that we consider the usages of both views in parallel.■ □

Finding Redundant Literals in the Rewritten Query

In this section we describe a polynomial algorithm for the second step. Given mappings from the views to the query, the algorithm determines a set of literals from the query that can be removed. We show that under certain conditions there is a unique maximal set of such literals and the algorithm is guaranteed to find them. In other cases, the algorithm may find only a subset of the redundant literals, but all the literals it removes are guaranteed to be redundant, and therefore the algorithm is always applicable. Note that in such cases, the rest of the query can still be minimized using known techniques. Together with an algorithm for enumerating mappings from the views to the query, our algorithm provides a practical method for finding rewritings. For simplicity, we describe the algorithm for the case of rewriting using a single occurrence of a view.

Suppose our query is of the form $$q(\overline{X}) :- p_1(\overline{U}_1), \ldots, p_n(\overline{U}_n). \tag{5}$$

and we have the following view:

$$v(\overline{Z}) :- r_1(\overline{W}_1), \ldots, r_m(\overline{W}_m). \tag{6}$$

Let h be a containment mapping from the body of v into the body of q, and let the following be the result of adding the view literal to the query:

$$q(\overline{X}) :- p_1(\overline{U}_1), \ldots, p_n(\overline{U}_n), v(\overline{Y}). \tag{7}$$

where $\overline{Y}=h(\overline{Z})$. Note that we can restrict ourselves to mappings where the variables of $\overline{Y}$ already appear in the $p_i(\overline{U}_i)$. To obtain a minimal rewriting, we want to remove as many of the $p_i$ literals as possible.

To determine she set of redundant literals, consider the rule resulting from substituting the definition of Rule (6) instead of the view literal in Rule (7). That is, we rename the variables of Rule (6) as follows. Each variable T that appears in $\overline{Z}$ is renamed to h(T), and each variable of Rule (6) that does not appear in $\overline{Z}$ is renamed to a new variable (that is not already among the $p_i(\overline{U}_i)$). Let the following be the result of this substitution.

$$q(\overline{X}) :- p_1(\overline{U}_1), \ldots, p_n(\overline{U}_n), r_1(\overline{V}_1), \ldots, r_m(\overline{V}_m). \tag{8}$$

Note that the variables of $\overline{Y}$ are the only ones that may appear in both the $p_i(\overline{U}_i)$ and the $r_j(\overline{V}_j)$.

Given the mapping h, there is a natural containment mapping from Rule (8) into the original rule for q (i.e., Rule (5)) that is defined as follows. Each subgoal $p_i(\overline{U}_i)$ is mapped to itself and each subgoal $r_j(\overline{V}_j)$ is mapped to the same subgoal of Rule (5) as in the containment mapping h (from Rule (6) to Rule (5)). We will denote this containment mapping as $\phi$. The following is an important observation about $\phi$: The containment mapping $\phi$ maps each variable of $\overline{Y}$ to itself.

Each subgoal $p_i(\overline{U}_i)$ of Rule (5) is the image (under $\phi$) of itself, and maybe a few of the $r_j(\overline{V}_j)$ literals. We say that the literals $r_j(\overline{V}_j)$ that map to $p_i(\overline{U}_i)$ under $\phi$ are the associates of $p_i(\overline{U}_i)$. For the rest of the discussion, we choose arbitrarily one of the associates of $p_i(\overline{U}_i)$ and refer to it as the associate of $p_i(\overline{U}_i)$. Note that if h maps each subgoal $r_j(\overline{V}_j)$ to a unique subgoal in Rule (5), then each $p_i(\overline{U}_i)$ will have at most one associate.

Before we define the set of redundant subgoals, we need the following definition:

Definition 5.3

A subgoal $r_j(\overline{V}_j)$ covers a subgoal $p_i(\overline{U}_i)$ if all of the following hold.

The subgoals $r_j(\overline{V}_j)$ and $p_i(\overline{U}_i)$ have the same predicate.

If $p_i(\overline{U}_i)$ has a distinguished variable (or a constant) in some argument position $\alpha$, then $r_j(\overline{V}_j)$ also has that variable (or constant) in argument position $\alpha$.

If argument positions $\alpha_1$ and $\alpha_2$ of $p_i(\overline{U}_i)$ are equal, then so are the argument positions $\alpha_1$ and $\alpha_2$ of $r_j(\overline{V}_j)$. □

The set of redundant literals in Q will be the complement of the needed literals, defined as follows:

Definition 5.4:

The set $\mathcal{N}$ is the minimal set satisfying the following four conditions.

1. All the $p_i(\overline{U}_i)$ that do not have associates are in $\mathcal{N}$.
2. If $r_j(\overline{V}_j)$ is the associate of $p_i(\overline{U}_i)$ and $r_j(\overline{V}_j)$ does not cover $p_i(\overline{U}_i)$, then $p_i(\overline{U}_i)$ is in $\mathcal{N}$.
3. Suppose that all of the following hold.
   Subgoal $p_i(\overline{U}_i)$ has the variable T in argument position $\alpha_1$.
   The associate of $p_i(\overline{U}_i)$ has the variable[2] H in argument position $\alpha_1$.

[2] Note that the associate of $p_i(\overline{U}_i)$ cannot have a constant in argument position $\alpha_1$ if $p_i(\overline{U}_i)$ has a variable in that argument position.

The variable H is not in $\overline{Y}$ (hence, H appears only among the $r_j(\overline{V}_j)$).
   The variable T also appears in argument position $\alpha_2$ of $p_1(\overline{U}_l)$.
   The associate of $p_i(\overline{U}_l)$ does not have H in argument position $\alpha_2$.
   Then $p_i(\overline{U}_i)$ is in $\mathcal{N}$.
4. Suppose that $p_i(\overline{U}_i)$ is in $\mathcal{N}$ and that variable T appears in $p_i(\overline{U}_i)$. If $p_l(\overline{U}_l)$ has variable T in argument position $\alpha$ and its associate does not have T in argument position $\alpha$, then $p_l(\overline{U}_l)$ is also in $\mathcal{N}$. □

EXAMPLE 5.14

Consider the query and the view of Example 5.11. The result of substituting the view in the query would be the following:

$$q(X,U) :- p(X,Y), p_0(Y,Z), p_1(X,W), p_2(W,U), p(X,C), p_0(C,Z), p_1(X,D).$$

The literal $p_2(W,U)$ is needed because it does not have an associate. The literal $p_1(X,W)$ is needed by condition 4 in the definition, because its associate $p_1(X,D)$ does not contain the variable W (which appears in $p_2(W,U)$). Consequently, these two literals need to be retained to obtain the minimal rewriting. □

Further details and the proofs of complexity may be found in A. Y. Levy, A. O. Mendelzon, Y. Sagiv, and D. Srivastava. "Answering queries using views", Submitted for publication, 1994.

Using Completeness Information

In generating a plan for answering a query, algorithm 301 accesses all (and only) sources that may contribute to answering the query. While this may be necessary in general, there are many cases where a small subset of the relevant site relations contains all the information needed to answer the query. Since completeness information of single sources can be expressed in the content specification 203 (using specifications of the forms (2) and (4)), the query processor can effectively use these forms of content specification 203 to ignore redundant sites.

EXAMPLE 5.15

Consider the airline flight application. Let the site relation ta_dir contain listings of all travel agents in the U.S. and let the site relation bigapple_dir contain listings of all telephone customers in the 212 area code.

Accessing both these site relations is redundant in order to answer a query that asks for the phone number of a specific travel agent in the 212 area code, although both these site relations are relevant to answering this query. Querying either of these two site relations suffices.

Both these site relations are also relevant to answer the query that asks for the phone number of a specific travel agent (without knowing the area code of the travel agent). However, querying ta_dir is sufficient in this case, though querying bigapple_dir may not be sufficient. □

Intuitively, we use content specifications of the form (2) as follows. Given that we are trying to compute tuples of a world-view relation E that satisfy the constraint C, we search for a minimal set $SD_1, \ldots SD_n$ of content specifications 205 which together can be used to compute all the tuples of E that satisfy C. Formally, the algorithm for doing this is the following.

Suppose we are trying to compute the tuples of $E(\overline{W})$ that satisfy the constraint $C(\overline{W})$. Our algorithm chooses a set $SD_E = \{SD_1, \ldots, SD_n\}$ of content specifications of the form (2):

$$C_R^j(\overline{Y}^j), R_1^j(\overline{X}_1^j), \ldots, R_k^j(\overline{X}_k^j) = C_E^j(\overline{W}), E(\overline{W})$$

for $1 \leq j \leq n$ such that:

$C(\overline{W}) \Rightarrow C_E^1(\overline{W}) \vee \ldots \vee C_E^n(\overline{W})$.

There is no subset of $SD_E$ that satisfies the first property.

If such a set does not exist for $C(\overline{W})$, then let $C'(\overline{W})$ be the weakest constraint for which such a set does exist. (The constraint $C'(\overline{W})$ can be obtained by conjoining $C(\overline{W})$ with the disjunction of the $C_E$'s of all content descriptions of the form (2).) The tuples of $E(\overline{W})$ that satisfy the constraint $C'(\overline{W})$ can be computed using content specifications 205 of the form (2), as above. Furthermore, let $C''(\overline{W})$ be $C(\overline{W})/C'(\overline{W})$. The tuples of $E(\overline{W})$ that satisfy the constraint $C''(\overline{W})$ can be computed using the other content specifications 205, as described in Algorithm 301.

Although the above algorithm is not a polynomial time algorithm (even for order constraints), the complexity of the algorithm is in the size of the representation of the query constraints and the site description constraints, not in the size or number of the site relations.

Dynamic Query Plans

In traditional database systems, the plan execution comes strictly after the query is optimized and the complete plan for evaluating the query is generated. Although such a static query plan is adequate for traditional database system applications, global information systems require dynamic plans, where the query plan generation phase interacts with the plan execution phase. The following example illustrates the benefits of postponing generating plans for sub-queries until run-time, when values are known for some of the query variables.

EXAMPLE 5.16

Consider the airline flight application. The following query retrieves the telephone numbers of travel agents in Manhattan, N.Y.:

query(AC, TelNo) :- areaCode('Manhattan, N.Y.', AC), travelAgent(Ag), dir(Ag, AC, TelNo).

The constraint travelAgent(Ag) present statically in the query entails that directory information sources that do not contain listings of travel agents are irrelevant to answering the query. However, in the absence of knowledge about tuples in the world-view relation areaCode (which are computed only at run-time), the query plan would have to treat all other directory information sources (e.g., the one for the 908 area code) as relevant to the query.

However, once the sub-query areaCode('Manhattan, N.Y.',AC) is evaluated, the bindings for AC (in this case just 212) can be used to restrict the set of relevant directory information sources to only those with area code 212. □

To be able to perform such optimizations, it is necessary that we pass sideways values computed for some of the query variables to create or modify segments of the query plan dynamically, i.e., at run-time. The following example illustrates the optimization benefits of passing not just values of the query variables, but also additional information obtained at run-time.

EXAMPLE 5.17

Suppose that unitedAgent and americanAgent were disjoint subconcepts of the concept travelAgent, i.e., no travel agent is both an agent for United Airlines and for American Airlines. Assume that the United Airlines information source provides a directory service for United Airlines agents ua_dir(Ag, AC, TelNo), and American Airlines provides a directory service for American Airlines agents aa_dir(Ag, AC, TelNo). The content specifications 205 for these site relations are as follows:

ua_agents(Ag, AC, TelNo)⊆unitedAgent(Ag), dir(Ag, AC, TelNo).

aa_dir(Ag, AC, TelNo)⊆americanAgent(Ag),dir(Ag, AC, TelNo).

Consider now the following query that retrieves the telephone numbers of award-winning travel agents (a subconcept of travelAgent).

query(AC, TelNo) :- awardTravelAgent(Ag),dir(Ag, AC, TelNo).

If a binding for awardTravelAgent(Ag) was found at a site that only had information about United Airlines agents, this information could be used to determine that the site relation aa_dir is irrelevant for answering the query, therefore showing that knowing the source from where the binding for Ag was found can be used to prune the directory sources where no matching listing would be found. □

The above examples illustrate the two key features of dynamic query plan generation:

1. Postpone planning for sub-queries until run-time, when sufficient information is available to determine a small set of relevant sources.

2. Pass additional information obtained at run-time, not just values of query variables, to the query optimizer.

We have identified two additional pieces of information that are very useful for pruning information sources, and which can be easily determined from the site descriptions, and passed in the binding information for query variables: (1) the type of the value, and (2) the location where the value was found. Details concerning the information and how to use it in an algorithm for dynamically generating a query are presented below.

A second reason for supporting dynamic query plans in a global information system is that when the external information sources are distributed over a computer network, it is quite likely some external sources are unavailable when required. In the presence of alternative information sources that can provide the same information (because of redundancy in the autonomous information sources), the query plan must be dynamically modifiable.

Types of Information which are Useful in Dynamic Query Generation

The following discussion provides details about the selection of information which is useful in dynamic query generation. The discussion is based on Craig A. Knoblock and Alon Levy, "Efficient Query Processing for Information Gathering Agents", to appear in working notes of the 1995 AAAI Spring Symposium on Information Gathering in Distributed and Heterogeneous Environments, available from AAAI. In the following, C, $C_i$ etc. denote classes in domain model 111. Binary relations among objects in domain model 111 are represented by roles (denoted by r, $r_i$ etc. ). The discussion also employs a running example in which system 101 has received a query concerning the publications of Ron Brachman, who is a researcher in artificial intelligence at ATT Bell Laboratories.

An information source 123 s can be viewed as providing some knowledge about a class in the domain model $C_s$. It can either provide some or all of the instances of the class $C_s$. In the latter case we will say that s is a complete source. The source s also provides some role fillers for the instances it knows about. Formally, s provides the role fillers for the roles $r_1^s, \ldots r_n^s$. For each role, s may provide all the fillers or only some of them. The information about which class and roles s knows about it is contained in information source description 113 for s.

We can now describe the kinds of information that can be obtained by system 101 at run time and how they can be used. The first set of information types (called domain information) include information about the class hierarchy and individuals in those classes. Specifically, we have identified the following types of information:

Membership An individual being a member (or not a member of a class), for example, Ron Brachman being an instance of AI-researcher.

Fillers One or more individuals filling a role of another individual (or not being a filler of a role), for example, that the affiliation of Ron Brachman is AT&T Bell Labs.

Size The size of a class or the number of fillers of a role.

Constraints High level constraints on classes or fillers of roles (e.g., all fillers are in a certain range).

Relationships Relationships between different classes or roles (e.g., one class contains another).[3]

[3] Note that intensional subsumption relationships between classes are can be inferred in the domain model. This class of information refers to extensional containment relationships, e.g., in the current state, all instances of $C_1$ are also instances of $C_2$.

The second set of information types (called source information) are like the above types, but concerns knowledge about information sources, and not about the domain model's class hierarchy:

Membership An individual being found in an information sources (or not being found there).

Fillers One or more individuals filling a role of another individual in a specific in formation source.

Size The number of class instances found in a specific information sources.

Constraints High level constraints specific to an information source (e.g., an information source only contains Bell Labs researchers).

Relationships Relationships between different classes or roles (e.g., source $s_1$ containing all the data in source $s_2$).

It should be noted that in some cases the domain information can be inferred from the source information, and the description of the sources.

Using the Information to Optimize Queries

There are several ways in which the information types outlined above can be used to optimize queries:

Membership Membership information can be useful in identifying an information source that is likely to contain additional information. If we found the individual $\alpha$ in source s, and a subsequent subgoal asks for the filler of a role r of $\alpha$, we will first check whether s contains fillers for r (which will be known in the description). Note that this type of information is especially useful because typically information sources will only have part of the instances of a class, and therefore, finding an instance in a given information sources is a significant piece of information.

Fillers Information about specific fillers for roles can be used to constrain the queries to other information sources. For example, if we learn the area code for Bob Jones from one information source, then it can be incorporated into the query sent to another information source.

Size Size information about classes and intermediate results is useful in ordering subgoals in a query. Traditional query processing systems estimate sizes before processing starts, but using actual size information may be critical when good estimates are unavailable.

Relationships The main use of additional domain model information is to rule out possible information sources. Knowing that an individual belongs to a more specific class that can be inferred from the query enables us to limit the number of sources considered in later subgoals of the query that contain the individual as a binding. For example, knowing that Ron Brachman is an AI researcher enables us to focus on paper repositories that provide AI publications. Knowing that he is an AT&T employee provides a justification for considering first a paper repository from AT&T researchers.

Constraints Domain-level constraints can be used by propagating the restrictions from one subgoal to the next. This is similar to some of the reformulations done with semantic query optimization, except that the constraints are identified dynamically instead of using precompiled information.

Completeness Completeness information about a class (or the fillers of a role) enable us to stop searching for more instances of the class (or fillers of that role).

Obtaining Domain and Source Information

A second dimension along which dynamic query processing methods differ is the way that the domain and source information are obtained:

Information can be found by simply solving subgoals in the query. Instead of recording only the values of the bindings that are found in solving a subgoal, we can also record the information sources in which they are found. Additional domain knowledge can be inferred from the description of the information source in which the binding was found. For example, if Ron Brachman was found in the AAAI-fellow information source, then we can infer that he is a member of the class AAAI-fellows, which is a subclass of AI-researcher. If Brachman was not found in an information source that contains all physics researchers, then we can infer that he is not a physicist. Details of this technique are presented below.

Information about a binding can be found in the process of trying to solve the subgoal that needs the information. For example, we may begin considering a few paper repositories to find Brachman's papers, and by doing so figure out that he is a member of AI-researcher class. This will enable us to prune the subsequent paper repositories we consider.

Information gained in solving previous queries can be used. The challenge here is to remember from previous queries only information that may be relevant in future queries, and will not change rapidly.

Finally, an the information agent can create new subqueries in order to actively seek information about bindings. For example, by considering the descriptions of information sources providing paper repositories, the agent can determine that knowing the affiliation and field of an author dramatically reduce the number of relevant information sources. Therefore, the agent may first pose a query looking for Brachman's field and affiliation, before solving the query.

Algorithm for Dynamically Generating a Query Plan: FIG. 4

In overview, the algorithm shown in FIG. 4 works by using type information received from information source 123 to prune the sub-plans used to compute the tuples for the rest of the query. In detail, algorithm 401 for dynamically generating a query plan first determines a join order using traditional techniques. Then, algorithm 401 operates in two phases when evaluating each conjunct in the query. In the first phase 405, algorithm 401 uses the known bindings for the query variables to generate a sub-plan for evaluating the conjunct. In the second phase 407, algorithm 401 accesses the relevant information sources and generates new bindings for the query variables using type information received from the relevant information sources. The type information appears in algorithm 401 as $C_R^{SD}$ 409, that is, a constraint on the external site relation. In other embodiments, information other than type binding information may be used. Algorithm 401 alternates between phase 405 and 407 until each conjunct in the query has been evaluated, and the query answered. Although algorithm 401 chooses a join order at compile-time, it is straightforward to extend the algorithm to use the binding information to decide on a join order dynamically.

It is important to stress that all the type information 409 that algorithm 401 uses for optimizing queries at run-time is available statically in the query and the various site descriptions. In principle, it is possible to generate all possible query plans at compile-time and merely choose from amongst these plans at run-time. Practically speaking, the large number of information sources makes this approach quite infeasible, and our algorithm creates plans for segments of the query at run-time.

Figure 5:
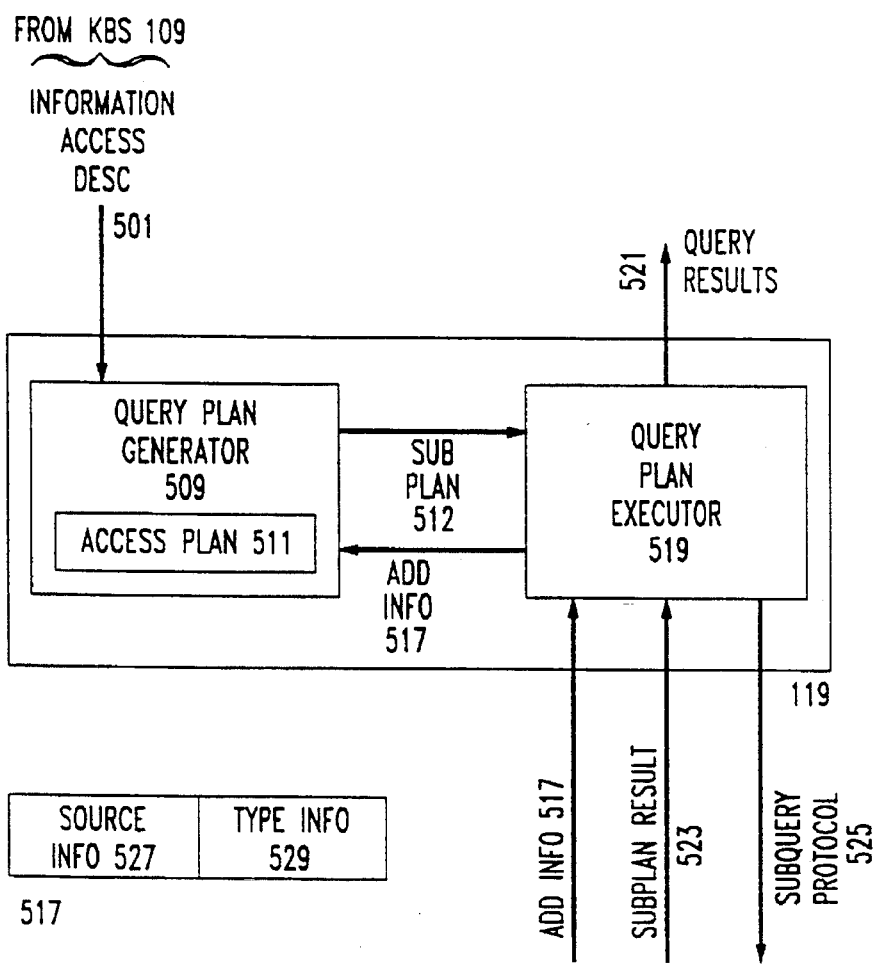
FIG. 5 is a detailed block diagram of access plan generation and execution component 119 of information retrieval system 101 in the preferred embodiment.

Access Plan Generation and Execution 119 in a Preferred Embodiment: FIG. 5

In order to implement algorithm 401, access plan generation and execution component 119 of system 101 must be modified as shown in FIG. 5. Component 119 has two subcomponents: query plan generator 509 and query plan executor 519. Query plan generator 509 responds to an information access description 501 from KBS 109 which contains site descriptions 201 by generating a query plan 511 which is made up of a number of subplans 512. Each subplan 512 is sent in turn to query plan executor 519. Query plan executor 519 executes the current subplan 512 by producing subquery protocol 525 for querying the information source 123 specified in current subplan 512. When the protocol is executed, it returns subquery results 523 and additional information 517 to query plan executor 519, which retains subplan results 523 and returns additional information 517 to query plan generator 509, which then prunes the remaining subplans 512 on the basis of the additional information. When all of the necessary subplans have been executed, the retained subquery results 523 go to graphical user interface 103 as query results 521.

In a presently-preferred embodiment, the additional information is treated as a constraint which applies to subplan result 523. That constraint is then applied to the concept for which the subplan was retrieving instances. If query plan 511 has unexecuted subplans 512 which include that concept and a constraint which is mutually satisfiable with the constraint defined by the additional information, those unexecuted subplans 512 may be pruned from query plan 511.

Conclusion

The foregoing Detailed Description has disclosed to those skilled in the art the best mode presently known to the inventors for implementing certain improvements to the information retrieval system disclosed in the parent of the present patent application. All of these improvements permit optimizations in query plans.

One group of improvements are found in the site descriptions. The site descriptions include components that indicate whether an information source can completely answer a query or provide only a partial answer, components that indicate what kinds of queries an information source can answer, and components that indicate which of those queries can be answered efficiently. The information retrieval system uses all of these components to generate more efficient query plans.

Another group of improvements involves dynamic query plan generation. The information returned by an information source includes not only the results of the subquery performed on the information source, but also information additional information which can then be used to modify the remaining query plan. Additional information about the source of the subquery results and the type of the results have been found to be particularly useful.

While the foregoing improvements are particularly advantageous when implemented in an information retrieval system like that disclosed in the present patent application, they may be implemented in other information retrieval systems as well. In particular, both the site descriptions and the additional information can be used for query plan optimization in standard data base systems, as well as in information retrieval systems which include knowledge bases. It should further be pointed out that what is important for the improvements is the information they provide for optimizing, not the particular manner in which that information is represented. Further, while the specific optimizing algorithms disclosed herein are the best presently known to the inventors, other algorithms may employ the same information to achieve similar ends.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. An improved information system for retrieving query result information from one or more information sources in response to a query, the information system including descriptions of the information sources and the improvement comprising query execution means including:

query plan generating means for receiving the query and the descriptions of the information sources and responding thereto by generating a query plan for retrieving the query result information from the information sources; and query plan execution means for receiving and responding to the query plan by retrieving the query result information from the information sources, the query plan execution means retrieving additional information from the information sources in addition to the query result information and providing the additional information to the query plan generation means in the course of executing the query plan, the additional information being type information indicating a type of the retrieved query result information; and the query plan generating means responding to the additional information and to the descriptions of the information sources by making a modification of the query plan and providing the modification to the query plan execution means for execution while the query plan execution means is executing the query plan, the query plan generating means further responds to the type information and the type description in making the modification of the query plan.

2. The improved information system set forth in claim 1, wherein a description of an information source includes a type description indicating a type of the information in the information source.

3. The improved information system set forth in any of claims 1, 2, or 3 wherein:

the information sources are located remotely from the information system.

4. The improved information system set forth in any of claims 1, 2, or 3 further comprising:

a knowledge base including concepts and wherein the descriptions of the information sources describe the information sources in terms of the concepts.

5. The improved information system set forth in claim 4 wherein:

the concepts include concepts relating to the information in the information sources and the additional information is an instance of a concept and the query plan generation means is further responsive to the instance as required by the query and the concepts relating to the information.

6. The improved information system set forth in claim 5 wherein:

the concepts in the knowledge base are ordered in a hierarchy; and the knowledge base responds to a new concept or a new instance by ordering the new concept or new instance in the hierarchy.

7. The improved information system set forth in claim 6 wherein:

the information sources are accessible by means of a plurality of protocols;

the concepts in the knowledge base include concepts which describe the protocols; and the query plan generation means is further responsive to the concepts which describe the protocols.

8. A memory medium readable by a computer system, the memory medium being characterized in that:

the memory medium contains code which, when executed by the computer system, implements the improved information system of claim 1 for retrieving query result information from one or more information sources in response to a query.

9. An information system for retrieving query result information from one or more information sources in response to a query, the information system comprising:

a knowledge base including concepts related to information in the information sources, the knowledge base receiving the query and responding thereto by producing an information access description which describes what information is to be accessed in terms of the concepts;

query plan generating means for receiving the information access description and responding to the information access description and the concepts by generating a query plan describing how the query result information is to be obtained from the information sources; and query plan execution means for receiving the query plan and executing the query plan to retrieve the query result information and additional information from the information sources and provide the additional information to the query plan generating means in the course of executing the query plan, the query plan generating means responding thereto and to the concepts by making a modification of the query plan and providing the modification to the query plan execution means for execution, the additional information being type information indicating a type of the retrieved query result information, the query plan generating means further responds to the type information and the type description in making the modification of the query plan.

10. The information system set forth in claim 9 wherein:

The information sources are accessed by a plurality of protocols; and the concepts in the knowledge base include concepts related to the protocols by means of which the information sources are accessed.

11. A method practiced in an information system which retrieves query result information from one or more information sources in response to a query, the method comprising the steps of:

receiving the query and the descriptions of the information sources and responding thereto by generating a query plan for retrieving the query result information from the information sources; and receiving and responding to the query plan by retrieving the query result information from the information sources;

retrieving additional information from the information sources in addition to the query result information and providing the additional information in the course of executing the query plan, the additional information being type information indicating a type of the retrieved query result informations; and responding to the additional information and to the descriptions of the information sources by making a modification of the query plan while executing the query plan, and further responding to the type information and the type description in making the modification of the query plan.

12. An improved information system for retrieving query result information from one or more information sources in response to a query, the information system including descriptions of the information sources that include a source description indicating a source of the information in the information source, and the improvement comprising query execution means including:

query plan generating means for receiving the query and the descriptions of the information sources and responding thereto by generating a query plan for retrieving the query result information from the information sources; and query plan execution means for receiving and responding to the query plan by retrieving the query result information from the information sources, the query plan execution means retrieving additional information from the information sources in addition to the query result information and providing the additional information to the query plan generation means in the course of executing the query plan, the additional information being source information indicating a source of the retrieved query result information; and the query plan generating means responding to the additional information and to the descriptions of the information sources by making a modification of the query plan and providing the modification to the query plan execution means for execution while the query plan execution means is executing the query plan, the query plan generating means further responds to the source information and the source description in making the modification of the query plan.

* * * * *